Mar. 20, 1923.  W. M. WINK  1,449,361
PORTABLE BORING MACHINE
Filed Sept. 14, 1921   4 sheets-sheet 3

Inventor
William M. Wink.

By
Lacey & Lacey, Attorneys

Mar. 20, 1923.  
W. M. WINK  
1,449,361  
PORTABLE BORING MACHINE  
Filed Sept. 14, 1921  
4 sheets-sheet 4
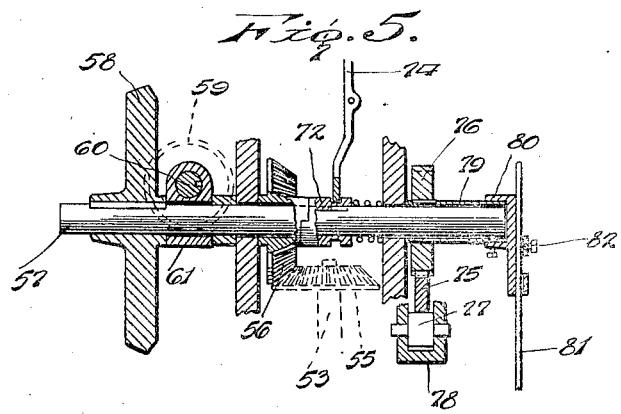
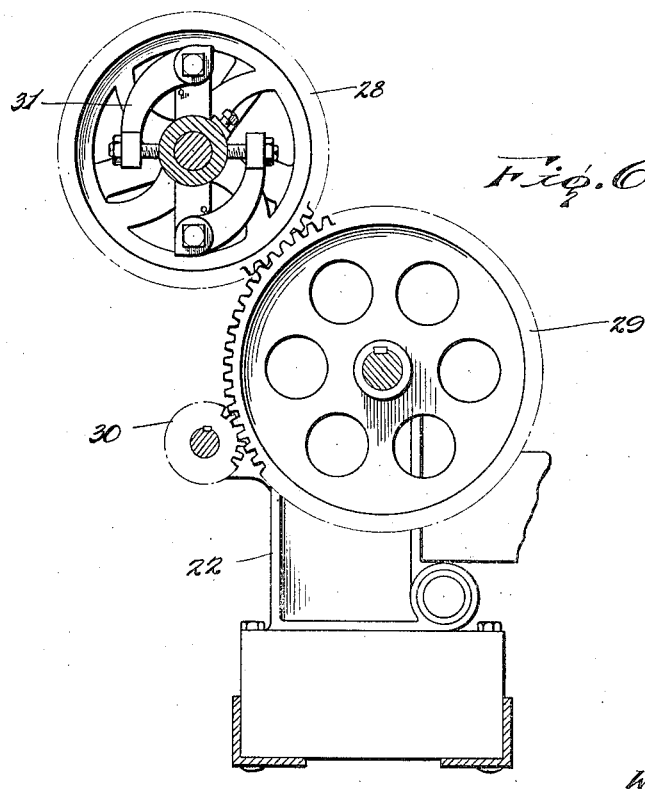
Inventor  
William M. Wink.
By  
Lacy & Lacy, Attorneys Patented Mar. 20, 1923.

1,449,361

UNITED STATES PATENT OFFICE.

WILLIAM M. WINK, OF OWENSBORO, KENTUCKY, ASSIGNOR OF ONE-HALF TO FREDERICK HORLANDER, OF ROME, KENTUCKY.

PORTABLE BORING MACHINE.

Application filed September 14, 1921. Serial No. 500,484.

*To all whom it may concern:*

Be it known that I, WILLIAM M. WINK, a citizen of the United States, residing at Owensboro, in the county of Daviess and State of Kentucky, have invented certain new and useful Improvements in Portable Boring Machines, of which the following is a specification.

My invention relates to improvements in boring machines and has for its principal object application of power to a vertical boring machine by means of a gasoline motor. It is intended for use for boring lumber in the general construction line and is for this purpose made portable, so that the entire device will include a motor and the boring machine may be easily transmitted from place to place. Another object of the invention is to provide an adjustable stand for the boring unit upon the base of the device, and for this reason the device has greater advantages in cutting mortices and length slots required in building construction.

The machine as illustrated in the drawings, has been thoroughly tested during a period of several months and as a result of this trial it has proven itself to be practical and of the highest degree of efficiency. It is able to accomplish the work of five men when properly handled by a single operator.

As the machine as shown weighs complete not over two hundred and twenty-five pounds, its position can easily be changed by two or three men, but it will be understood that the device may be constructed lighter and of smaller dimensions or larger and heavier, depending on circumstances and localities.

It will be evident that the machine can be used not only as a boring machine but also as a screw driving machine or for any other machine operation where a rotating tool is employed.

One embodiment of the invention is illustrated in the accompanying drawings, and Figure 1 is a side elevation, partly in section, of a boring machine in position on its stand with motor and gearing complete;

Figure 5 is a cross section along line 5—5 of Figure 2;

Figure 6 is a cross section along line 6—6 of Figure 2 drawn in larger scale.

Figure 1:
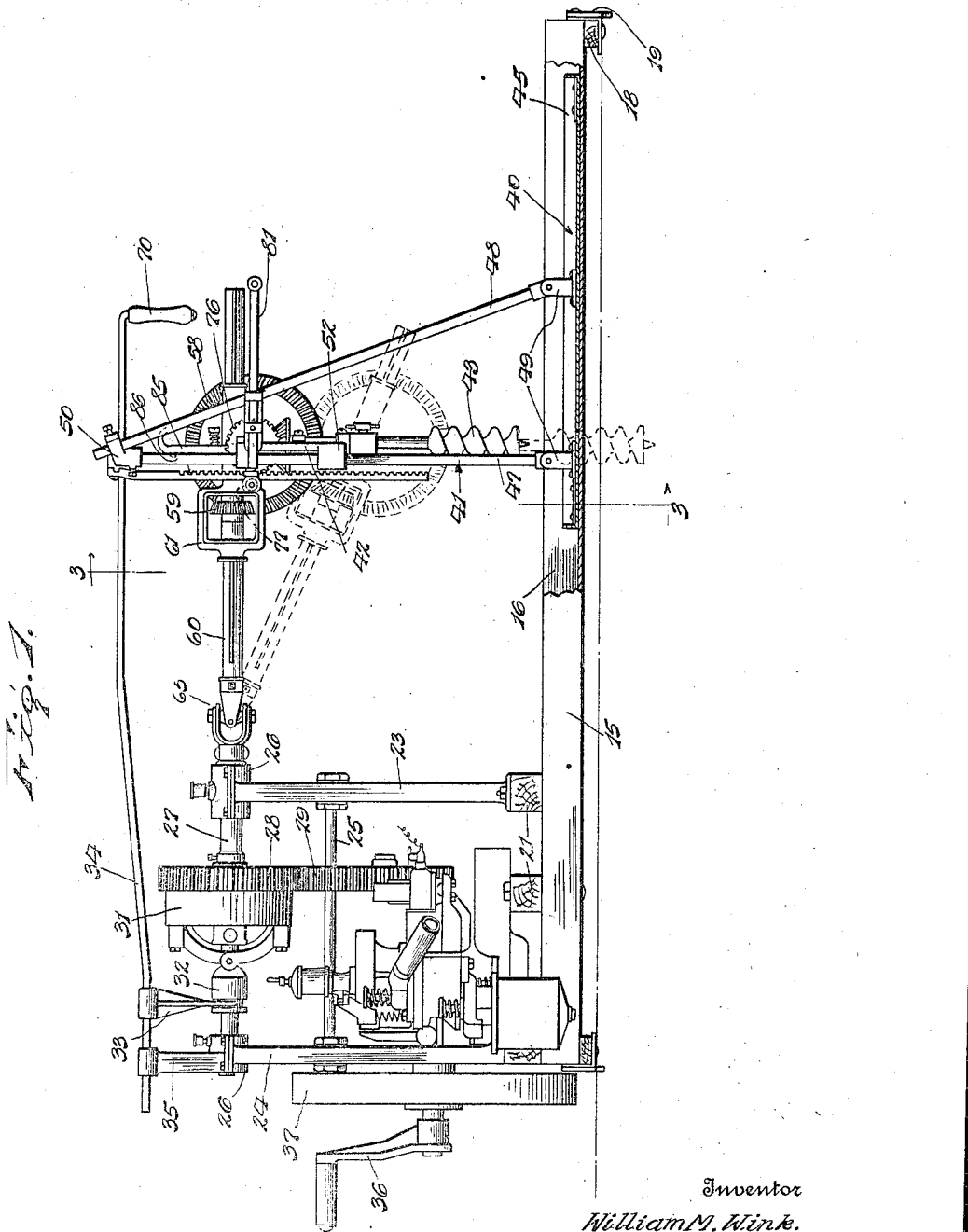
Figure 2:
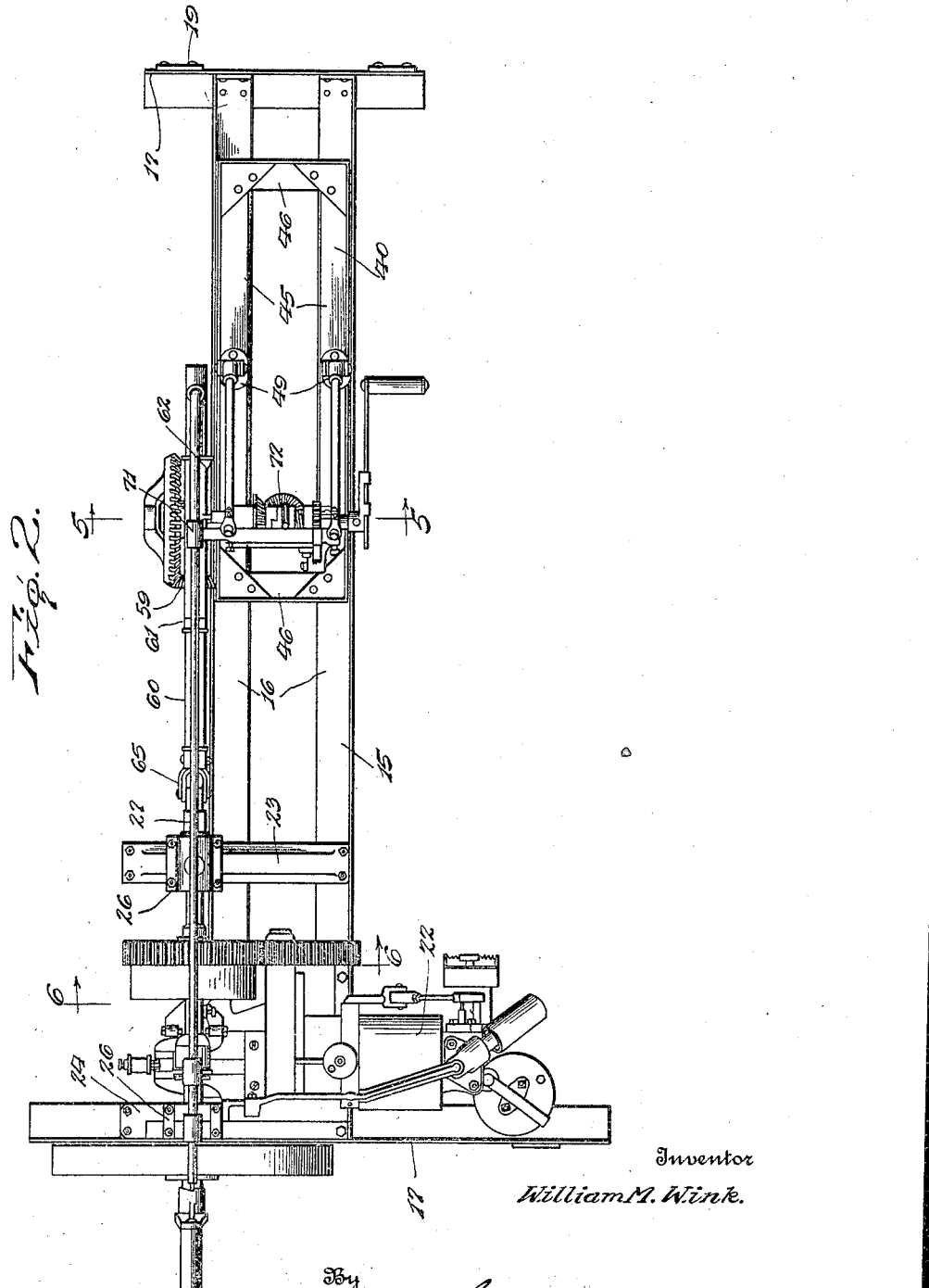
Figure 2 is a top plan view of Figure 1.
Figure 3:
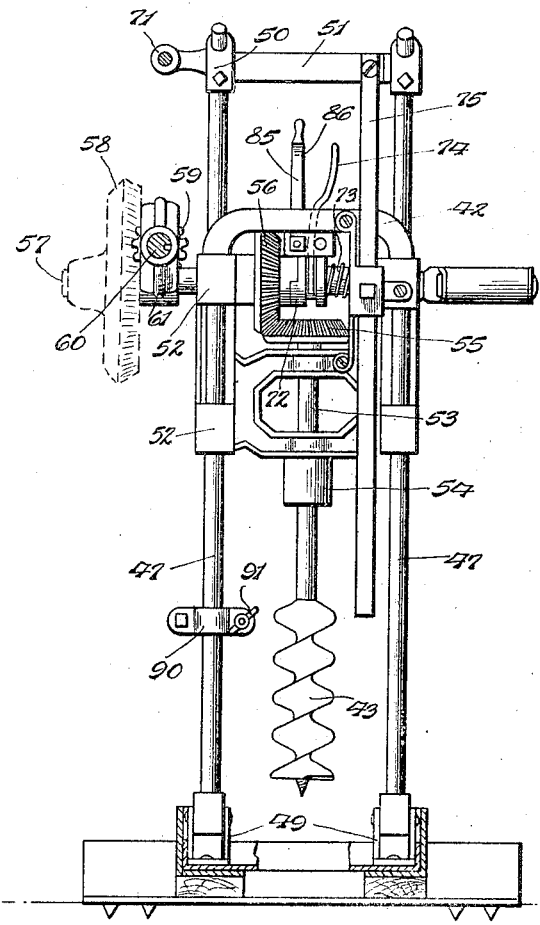
Figure 3 is a vertical section along line 3—3 of Figure 1.
Figure 7:
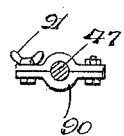
Figure 7 is a detail of a stop.
Figure 4:
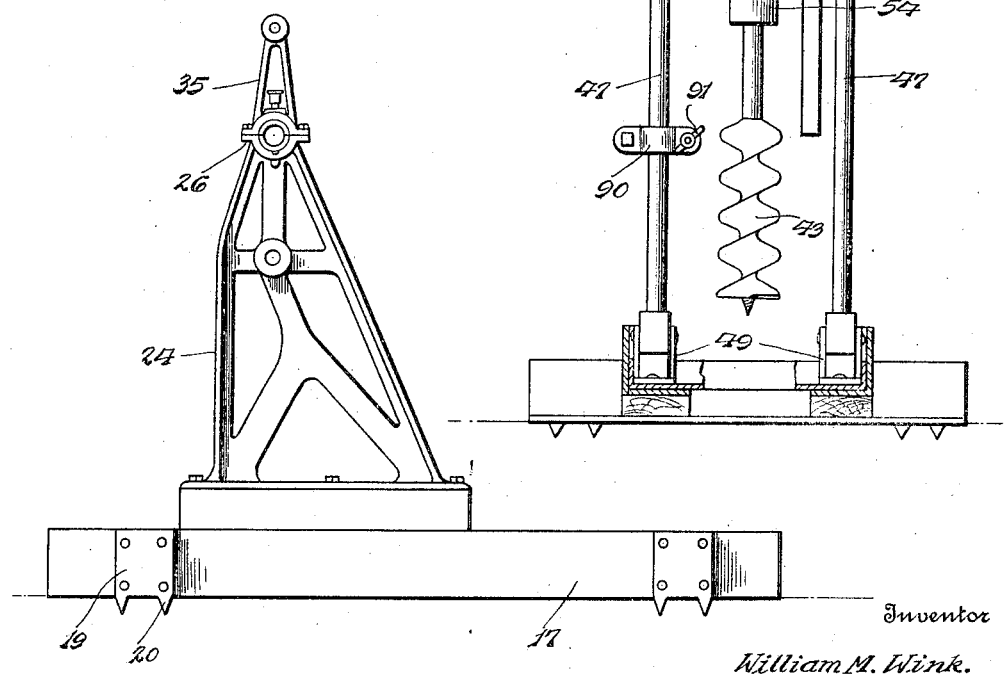
Figure 4 is a rear elevation of one of the main shaft supports.

In the drawings reference numeral 15 denotes the base of the device, preferably constructed of two parallel angle irons 16 which are suitably braced and connected at both ends by cross angles 17, which are longer than the general width of the base to form a firm support for the same. Wooden blocks 18 are inserted between the angles 16 and 17 for the purpose of raising the base slightly above the ground and grippers or claws 19 are provided at the outer ends of the angles 17, the teeth 20 of which penetrate into the foundation upon which the machine is resting during operation.

Cross beams 21 are provided on top of the angles 16 near one end of the base intended for carrying the motor and gearing. The motor 22 is placed on two of these cross beams 21 and may be of any suitable design, whether upright or horizontal, and is here shown as a gasoline motor, but of course kerosene or any other liquid fuel may be employed. A starting handle 36 and a fly wheel 37 are here shown to the rear of the machine.

In front and rear of the motor are placed two stands or main supports 23 and 24 for the gearing. These supports are bolted on top of the cross beams 21 and provided with a suitable brace 25 for holding them rigidly together. At the upper end of the supports 23 and 24 are provided bearings 26 for the main shaft 27 which runs in the longitudinal direction of the base. Upon this shaft a spur gear 28 is mounted to run loosely and is in mesh with a similar gear 29 driven by the driver 30 from the motor shaft. A clutch 31 is also mounted on the main shaft 27 and held securely thereon. This clutch is provided with a sliding muff 32 actuated by a yoke 33 carried on an actuating rod 34 which extends forwardly on the machine. A suitable bearing 35 for this rod 34 forms part of the cap for bearing 26, bolted to the top of the rear support 24.

The boring unit comprises a slide 40, a stand 41, a cross head 42, and a suitable gearing connection to the main shaft 27 for rotating the bit 43. The slide 40 is preferably constructed of angle irons, of which two, 45, run in longitudinal direction and the other two 46, in transverse direction of the slide, and these angle irons are suitably braced and riveted together at the corners. The width of the slide is so selected that it fits between the upright walls of the angle irons 16 of the base so that the slide may be shifted in longitudinal direction upon the base 15. The slide may be clamped or in any other suitable manner held in a selected position upon the base.

The stand 41 consists of two perpendicular bars 47 and two inclined bars 48 each provided with suitable ears at their lower ends and connected by means of bolts to the feet 49 fastened to the slide 40. The bars 47 and 48 converge upwardly to meet at the top. Where they are held together by means of brackets 50 and a cross connection 51.

The cross head 42 is made to slide up and down on the perpendicular bars 47, and is for this purpose provided with bearing lugs 52 embracing these bars. This cross head 42 is made in the shape of an open frame and has bearings for the perpendicular shaft 53 which, at its lower end, carries a chuck 54 for the boring bit 43 or any other revoluble tool. At the upper end of the shaft 53 is secured a gear 55 meshing with a similar gear 56 running loosely on a cross shaft 57, which is also carried in the cross head 42. This shaft 57 has a large gear 58 keyed on one end thereof and in mesh therewith is a pinion 59 to the rear of the stand 41. The pinion 59 is keyed on a driving shaft 60 in such a manner that a sliding motion is permitted between the pinion and the shaft. The bearing for this shaft consists of a yoke 61 provided with a forwardly extending tube 62 embracing shaft 60. This yoke 61 is carried upon the shaft 57 so that the shaft is able to revolve therein and it will be noted that the axis of this shaft and the pinion 59 does not run radially with respect to shaft 57 and gear 58 but tangentially to a circle concentric to the axis of the shaft 57. For this reason the teeth and gears 58 and 59 cannot be cut radially but directed tangentially to said circle.

The rear end of shaft 60 is connected to the main shaft 27 by means of a universal joint 65 of any well known construction and the shaft 60 extends sufficiently far beyond the end of the tube 62 of the yoke 61 to permit the slide 40 to be placed at the foremost end of the base, without loosing its grip on the pinion 59. It will also be understood that upon raising and lowering the cross head 42 to its limits between the upper and lower ends of the stand 41, the yoke 61 will be able to oscillate upon the shaft 57 from the fulcrum point of the universal joint 65, while the pinion 59 is still in positive engagement with the shaft 60, or in other words that the working tool 43 will continue to revolve independently of the position, up and down, of the cross head 42 on the stand 41, as well as the position of the slide 40 in relation to the base 15.

At the forward end of the starting rod 34 is provided a handle 70 and this rod runs in a bearing 71 provided on one of the brackets 50. Keyed to shaft 57 and between the two sides of the cross head 42, is a coupling muff 72 which is normally held in engagement with the hub of the bevel gear 56 by means of a spring 73 so that with the parts in this position, the bevel gears 56 and 55 will run whenever the large gear 58 is running. This coupling muff 72 can be drawn out from engagement with the bevel gear 56 by manipulation of its handle 74, so that without touching the handle 70 the boring tool 43 may be stopped momentarily while the shafts 57 and 58 are still running because, as already said, the bevel gear 56 runs loosely upon the shaft 57.

For the purpose of raising and lowering the cross head 42 and with it the working tool 43, a rack 75 is suspended from the cross bar 51 at the top of the stand 41. The teeth on rack 75 will permanently mesh with a spur gear 76 running loosely on the shaft 57 and the rack and gear are held together by means of a roller 77 carried by a spider 78 bolted to the cross head 42. Referring to Figure 5 it will be seen that the spur gear 76 has a sleeve like hub 79 which at its outer end carries a hub 80 for a crank handle 81, this hub being rigidly secured upon the end of the hub 79 so that the crank handle 81 and the gear 76 will always run together. In order to make the length of the crank arm adjustable, it is made to slide upon an extension of the hub 80 and is held rigid in connection therewith by means of set screws 82. It will now be seen that by turning the crank handle 81 the cross head with the entire gearing and the working tool carried by the same, may be lowered or raised as required.

A spring catch 85 with a tooth 86 is provided for the purpose of holding the cross head with the gearing in the uppermost position on the stand 41, when the cross head has been raised and the machine is not in use. The tooth 86 then engages over the top of the cross bar 51. Upon one or both of the upright bars 47 is provided a stop or clamp 90 which may be adjusted up or down on a bar and held by means of a clamp or wing nut 91. This clamp is used for obtaining uniformity in the depth of a number of holes to be bored and it is clear that, with the boring tool resting on top of the work, the distance between the lower face of the bearing member 52 on the cross head 42, and the upper face of the clamp 90, will represent the exact depth of the holes.

The machine is operated in the following manner:

After the base with the motor and the boring unit upon it has been placed in a proper position for doing the work, the slide 40 is pushed back or forth on the base until the boring tool is in alignment with the part to be bored. The motor is now started by turning the starting crank to rotate the fly-wheel which will set the gearings 30, 29 and 28 in motion. As, however, the gear wheel 28 runs loosely on shaft 27, the boring unit will still remain stationary. The clutch handle 70 is now drawn toward the operator in the direction of the arrow X in Figure 1, which will connect the clutch 31 with the gear wheel 28 and start the turning of the shafts 27 and 60 and gears 59 and 58 together with the cross shaft 57 and muff coupling 72. While holding the coupling 72 out of engagement with the bevel gear 56, the catch 85 is released and by means of the crank handle 81, the cross head with the gearing and the boring tool 43 is lowered until the latter rests on top of the work to be operated upon. The crank handle 81 is now released and by letting go of the handle 74, the coupling engages with the gear wheel 56, which now starts to revolve with the shaft 57 and actuates gear wheel 55 together with the upper right shaft 53 and the boring tool 43. The boring tool 43 will now start to revolve and bore the hole to depth equal to the setting of the stop clamp 90, because as soon as the lower bearing 52 of the cross head 42 has gone far enough to abut against the clamp 90, the tool 43 cannot penetrate any deeper in the work even if it continues to revolve before the muff coupling 72 is drawn out. As soon as that has been done the head together with the tool 43 are elevated by means of the crank handle 81 through the intermediary of rack and wheel 75 and 76.

It will be noted that the feeding of the boring tool normally is done by gravity, but that the handle 81 may also be utilized for this purpose, particularly if the material to be operated upon is very hard, or if the rapidity of boring is desired to be increased.

Having thus described the invention what is claimed as new is:

1. In combination with a portable base carrying a motor with suitable gears and provided with longitudinal run ways, a main shaft and a clutch between said gears and said shaft; of a slide adjustably arranged upon said run ways, a stand including feet secured on said slide, a pair of guides secured in a pair of said feet, braces rigidly connecting the free ends of the guides with another pair of said feet, the corresponding guides and braces being situated in the same longitudinal plane as said slide, a cross head adapted to slide on said guides, a revoluble tool carried by said cross head, a transmission connecting said main shaft and said tool, and an operating handle for said clutch mounted on said stand.

2. In combination with a portable base carrying a motor with suitable gears and provided with longitudinal run ways, a main shaft and a clutch between said gears and said shaft; of a slide adjustably arranged upon said run ways, a stand including feet secured on said slide, a pair of guides secured in a pair of said feet, braces rigidly connecting the rear ends of the guides with another pair of said feet, the corresponding guides and braces being situated in the same longitudinal plane of said slide, a cross head adapted to slide on said guides, a revoluble tool carried by said cross head, a transmission connecting said main shaft and said tool, an operating handle for said clutch mounted on said stand, and means for displacing said tool in the direction of its axis of operation.

3. In combination with a portable base carrying a motor with suitable gears and provided with longitudinal run ways, a main shaft and a clutch between said gears and said shaft; of a slide adjustably arranged upon said run ways, a stand including feet secured on said slide, a pair of guides secured in a pair of said feet, braces rigidly connecting the free ends of the guides with another pair of said feet, the corresponding guides and braces being situated in the same longitudinal plane of said slide, a cross head adapted to slide on said guides, a revoluble tool carried by said cross head, a transmission connecting said main shaft and said tool, an operating handle for said clutch mounted on said stand, means for displacing said tool in the direction of its axis of operation, and a stop connected with said guides for limiting the extension of said displacement.

4. In combination with a portable base carrying a motor with suitable gears and provided with longitudinal run ways, a main shaft and a clutch between said gears and said shaft; of a slide adjustably arranged upon said run ways, a stand including feet secured on said slide, a pair of guides secured in a pair of said feet, braces rigidly connecting the free ends of the guides with another pair of said feet, the corresponding guides and braces being situated in the same longitudinal plane of said slide, a cross head adapted to slide on said guides, a revoluble tool carried by said cross head, a transmission connecting said main shaft and said tool, and an operating handle for said clutch mounted on said stand, said transmission including a coupling member adapted to be actuated independent of said clutch operating handle, said transmission comprising a shaft for the working tool in alignment therewith, an operating shaft running transversely to said tool shaft, both of said shafts running in bearings on said cross head, a bevel gear rigidly secured on said tool shaft and the second bevel gear in mesh with said first bevel gear mounted loosely upon said transverse shaft, a coupling keyed upon said transverse shaft and adapted to engage said second bevel gear, and means for actuating said coupling independently of said clutch operating handle.

5. In combination with a portable base carrying a motor with suitable gears and provided with longitudinal run ways, a main shaft and a clutch between said gears and said shaft; of a slide adjustably arranged upon said run ways, a stand including feet secured on said slide, a pair of guides secured in a pair of said feet, braces rigidly connecting the free ends of the guides with another pair of said feet, the corresponding guides and braces being situated in the same longitudinal plane of said slide, a cross head adapted to slide on said guides, a revoluble tool carried by said cross head, a transmission connecting said main shaft and said tool, and an operating handle for said clutch mounted on said stand, said transmission comprising a shaft for the working tool in alignment therewith, an operating shaft running transversely to said tool shaft, both of said shafts running in bearings on said cross head, a longitudinal shaft having a universal joint connection with said main shaft, a sleeve mounted loosely on said transverse shaft and forming a bearing for said longitudinal shaft, a clutch between said sleeve and said transverse shaft, said longitudinal shaft having slidable and revoluble bearing in said sleeve and in tangential direction with respect to said transverse shaft, a bevel gear secured to said transverse shaft and a pinion slidably but non-revolubly mounted upon said longitudinal shaft in said sleeve and meshing with said last named gear.

6. In combination with a portable base carrying a motor with suitable gears and provided with longitudinal run ways, a main shaft and a clutch between said gears and said shaft; of a slide adjustably arranged upon said run ways, a stand including feet secured on said slide, a pair of guides secured in a pair of said feet, braces rigidly connecting the free ends of the guides with another pair of said feet, the corresponding guides and braces being situated in the same longitudinal plane of said slide, a cross head adapted to slide on said guides, a revoluble tool carried by said cross head, a transmission connecting said main shaft and said tool, and an operating handle for said clutch mounted on said stand, said transmission comprising a shaft for the working tool in alignment therewith, an operating shaft running transversely to said tool shaft, both of said shafts running in bearings on said cross head, a longitudinal shaft having a universal joint connection with said main shaft, a sleeve mounted loosely on said transverse shaft and forming a bearing for said longitudinal shaft, a clutch between said sleeve and said transverse shaft, said longitudinal shaft having slidable and revoluble bearing in said sleeve and in tangential direction with respect to said transverse shaft, a bevel gear secured to said transverse shaft and a pinion slidably but non-revolubly mounted upon said longitudinal shaft in said sleeve and meshing with said last named gear, and means for displacing said tool in the direction of its axis of operation.

In testimony whereof I affix my signature.

WILLIAM M. WINK. [L. S.]